(12) United States Patent
Amin

(10) Patent No.: US 12,299,593 B2
(45) Date of Patent: May 13, 2025

(54) SYSTEMS AND METHODS FOR OPTIMIZING ANNEALING PARAMETERS

(71) Applicant: D-WAVE SYSTEMS INC., Burnaby (CA)

(72) Inventor: Mohammad H. Amin, Coquitlam (CA)

(73) Assignee: D-WAVE SYSTEMS INC., Burnaby (CA)

(*) Notice: Subject to any disclaimer, the term of this patent is extended or adjusted under 35 U.S.C. 154(b) by 1136 days.

(21) Appl. No.: 17/154,210

(22) Filed: Jan. 21, 2021

(65) Prior Publication Data

US 2021/0241143 A1 Aug. 5, 2021

Related U.S. Application Data

(60) Provisional application No. 62/970,217, filed on Feb. 5, 2020.

(51) Int. Cl.
 *G06N 5/04* (2023.01)
 *G06N 10/60* (2022.01)
 *G06N 20/00* (2019.01)

(52) U.S. Cl.
 CPC ............... *G06N 5/04* (2013.01); *G06N 10/60* (2022.01); *G06N 20/00* (2019.01)

(58) Field of Classification Search
 None
 See application file for complete search history.

(56) References Cited

U.S. PATENT DOCUMENTS

| | | | |
|---|---|---|---|
| 7,135,701 B2 | 11/2006 | Amin et al. | |
| 7,275,010 B2 | 9/2007 | Mitschang | |
| 7,418,283 B2 | 8/2008 | Amin | |
| 7,533,068 B2 | 5/2009 | Maassen et al. | |
| 7,624,088 B2 | 11/2009 | Johnson et al. | |
| 7,788,192 B2 | 8/2010 | Amin | |

(Continued)

FOREIGN PATENT DOCUMENTS

| | | | |
|---|---|---|---|
| CN | 1498416 A | 5/2004 | |
| CN | 101399425 A | 4/2009 | |

(Continued)

OTHER PUBLICATIONS

Dickson, N.G. et al., "Algorithmic Approach to Adiabatic Quantum Optimization," Physical Review A 85(032303), 7 pages, 2012.

(Continued)

*Primary Examiner* — Alan Chen

(74) *Attorney, Agent, or Firm* — Cozen O'Connor

(57) ABSTRACT

A quantum annealing schedule for a computational problem can be adjusted by methods and systems involving one or more processors. The one or more processors proceed by receiving a representation of the computation problem, the representation including a plurality of problem values. These problem values are transformed based on a plurality of trained parameters of a machine learning model to generate at least a portion of an annealing schedule including at least one annealing parameter. Instructions are transmitted to the quantum processor to cause the quantum processor to evolve from an initial state to a final state based on the computational problem and the at least a portion of an annealing schedule, the final state producing a result for the computational problem.

18 Claims, 5 Drawing Sheets

(56) References Cited

U.S. PATENT DOCUMENTS

| | | |
|---|---|---|
| 7,800,395 B2 | 9/2010 | Johnson et al. |
| 7,843,209 B2 | 11/2010 | Berkley |
| 7,876,248 B2 | 1/2011 | Berkley et al. |
| 7,898,282 B2 | 3/2011 | Harris et al. |
| 7,984,012 B2 | 7/2011 | Coury et al. |
| 8,008,942 B2 | 8/2011 | Van et al. |
| 8,035,540 B2 | 10/2011 | Berkley et al. |
| 8,098,179 B2 | 1/2012 | Bunyk et al. |
| 8,174,305 B2 | 5/2012 | Harris |
| 8,175,995 B2 | 5/2012 | Amin |
| 8,190,548 B2 | 5/2012 | Choi |
| 8,195,596 B2 | 6/2012 | Rose et al. |
| 8,229,863 B2 | 7/2012 | Amin et al. |
| 8,244,662 B2 | 8/2012 | Coury et al. |
| 8,421,053 B2 | 4/2013 | Bunyk et al. |
| 8,536,566 B2 | 9/2013 | Johansson et al. |
| 8,670,807 B2 | 3/2014 | Rose et al. |
| 8,700,689 B2 | 4/2014 | Macready et al. |
| 9,069,928 B2 | 6/2015 | Van Den Brink et al. |
| 9,218,567 B2 | 12/2015 | Macready et al. |
| 9,882,112 B2 | 1/2018 | Kwon et al. |
| 9,949,020 B1 | 4/2018 | Gedney et al. |
| 10,599,988 B2 | 3/2020 | Thom et al. |
| 11,157,817 B2 | 10/2021 | Rolfe |
| 11,295,225 B2 | 4/2022 | Hoskinson et al. |
| 2003/0141868 A1 | 7/2003 | Bakharev |
| 2005/0059138 A1 | 3/2005 | Vitaliano et al. |
| 2005/0119829 A1 | 6/2005 | Bishop et al. |
| 2006/0115145 A1 | 6/2006 | Bishop et al. |
| 2008/0103996 A1 | 5/2008 | Forman et al. |
| 2009/0078931 A1 | 3/2009 | Berkley |
| 2009/0121215 A1 | 5/2009 | Choi |
| 2009/0289638 A1 | 11/2009 | Farinelli et al. |
| 2010/0185422 A1 | 7/2010 | Hoversten |
| 2010/0228694 A1 | 9/2010 | Le et al. |
| 2011/0060780 A1 | 3/2011 | Berkley et al. |
| 2012/0319684 A1 | 12/2012 | Gambetta et al. |
| 2014/0025926 A1 | 1/2014 | Yao et al. |
| 2014/0040176 A1 | 2/2014 | Balakrishnan et al. |
| 2014/0214835 A1 | 7/2014 | Oehrle et al. |
| 2014/0297235 A1 | 10/2014 | Arora et al. |
| 2014/0297247 A1 | 10/2014 | Troyer et al. |
| 2015/0009746 A1 | 1/2015 | Kucsko et al. |
| 2015/0032992 A1 | 1/2015 | Goettfert et al. |
| 2015/0032994 A1 | 1/2015 | Chudak et al. |
| 2015/0262073 A1 | 9/2015 | Lanting |
| 2015/0269124 A1 | 9/2015 | Hamze et al. |
| 2015/0324705 A1 | 11/2015 | Biercuk et al. |
| 2015/0363708 A1 | 12/2015 | Amin et al. |
| 2016/0042294 A1 | 2/2016 | Macready et al. |
| 2016/0071021 A1 | 3/2016 | Raymond |
| 2017/0017894 A1 | 1/2017 | Lanting et al. |
| 2017/0330101 A1* | 11/2017 | Hastings ............... G06N 99/00 |
| 2018/0307988 A1 | 10/2018 | Fano et al. |
| 2018/0308007 A1 | 10/2018 | Amin et al. |
| 2018/0330264 A1 | 11/2018 | Lanting et al. |
| 2018/0341874 A1 | 11/2018 | Puri et al. |
| 2018/0365587 A1 | 12/2018 | Barzegar et al. |
| 2019/0266510 A1 | 8/2019 | Yarkoni et al. |
| 2021/0004709 A1* | 1/2021 | Mohseni ............... G06F 17/11 |
| 2021/0241143 A1 | 8/2021 | Amin |
| 2022/0215282 A1 | 7/2022 | Amin |

FOREIGN PATENT DOCUMENTS

| | | |
|---|---|---|
| CN | 104715806 A | 6/2015 |
| JP | 2012502563 A | 1/2012 |
| KR | 20170076473 A | 7/2017 |
| WO | 2005093649 A1 | 10/2005 |
| WO | 2007085074 A1 | 8/2007 |
| WO | 2012064974 A2 | 5/2012 |
| WO | 2013082382 A1 | 6/2013 |
| WO | 2015156126 A1 | 10/2015 |
| WO | 2016089711 A1 | 6/2016 |
| WO | 2016210018 A1 | 12/2016 |
| WO | 2017075246 A1 | 5/2017 |
| WO | 2018058061 A1 | 3/2018 |

OTHER PUBLICATIONS

Lanting, T. et al., "Experimental Demonstration of Perturbative Anticrossing Mitigation Using Nonuniform Driver Hamiltonians," Physical Review A 96(042322), 8 pages, 2017.

Boixo, et al., "Experimental signature of programmable quantum annealing", arXiv:1212.1739v1 [quant-ph], Dec. 7, 2012, 12 pages.

Ben-Tal, et al., "Robust optimization—methodology and applications", Math. Program., Ser. B 92: 453-480 (2002), Digital Object Identifier (DOI) 10.1007/s101070100286.

Karimi, et al., "Boosting quantum annealer performance via sample persistence", arXiv:1606.07797v4 [quant-ph] May 18, 2017, 25 pages.

Lewis, et al., "Probabilistic multistart with path relinking for solving the unconstrained binary quadratic problem", Int. J. Operational Research, vol. 26, No. 1, 2016.

Non Final Office Action for U.S. Appl. No. 17/379,172, mailed Sep. 15, 2022, 11 pages,.

Bluhm, et al., "Enhancing the Coherence of Spin Qubits by Narrowing the Nuclear Spin Bath Using a Quantum Feedback Loop", arXiv:1003.4031v1 [cond-mat.mes-hall] Mar. 21, 2010, 5 pages.

Kechedzhi, et al., "Efficient population transfer via non-ergodic extended states in quantum spin glass", arXiv:1807.04792v1 [quant-ph] Jul. 12, 2018, 16 pages.

King, et al., "Quantum critical dynamics in a 5000-qubit programmable spin glass", arXiv:2207.13800v1 [quant-ph] Jul. 27, 2022, 41 pages.

Mohseni, et al., "Engineering non-equilibrium quantum phase transitions via casually gapped Hamiltonians" arXix:1804.11037v2 [quant-ph] Oct. 19, 2018, 16 pages.

Preskill, "Quantum Computing in the NISQ era and beyond", arXiv: 100862v3 [quant ph] Jul. 31, 2018, 20 pages.

Smelyanskiy, et al., "Non-ergodic delocalized states for efficient population transfer within a narrow band of the energy landscape", arXiv:1802.09542v2 [quant-ph] May 23, 2018, 48 pages.

Wang, et al., "Many-body localization enables iterative quantum optimization", arXiv:2111.00842v1 [quant-ph], Nov. 1, 2021, 7 pages.

Amin et al., Macroscopic Resonant Tunneling in the Presence of Low Frequency Noise, arXiv:0712.0845 [cond-mat.mes-hall], May 13, 2008, pp. 1-4.

Bunyk et al., "Architectural Considerations in the Design of a Superconducting Quantum Annealing Processor," IEEE Trans. Appl. Supercond., 24, arXiv:1401.5504v1 [quant-ph] Jan. 21, 2014, 9 pages.

Swersky , Multi-Task Bayesian Optimization, Advances in Neural Information Processing Systems 26, 2013, pp. 1-9.

Chinese Office Action for Application No. CN 2016800763698, dated Jun. 11, 2021, 26 pages (including English translation).

Clarke et al., "Quiet Readout of Superconducting Flux States," Physica Scripta. T102: 173-177, 2002.

Denchev et al., "What is the Computational Value of Finite Range Tunneling," arXiv:1512.02206 Jan. 22, 2016.

Harris et al., "Probing Noise in Flux Qubits via Macroscopic Resonant Tunneling", arXiv:0712.0838v2 [cond-mat.mes-hall], Feb. 8, 2008, pp. 1-4.

Hendrik Bluhm et al., "Enhancing the Coherence of a Spin Qubit by Operating it as a Feedback Loop that Controls its Nuclear Spin Bath", Physical Review Letters, Nov. 19, 2010 (Year: 2010).

International Search Report for PCT/US2020/027532, mailed Jul. 23, 2020, 3 pages.

Kone et al., "Selection of Temperature Intervals for Parallel-tempering Simulations", The Journal of Chemical Physics Mar. 25, 2005. https://aip.scitation.org/doi/10.1063/1.1917749.

Kumar, P. et al., "Origin and Suppression of 1/f Magnetic Flux Noise," arXiv:1604.00877v1 [cond-mat.supr-con] Apr. 4, 2016, 13 pages.

(56) References Cited

OTHER PUBLICATIONS

Snoek, et al., Practical Bayesian Optimization of Machine Learning Algorithms, arXiv: 1206.2944v2 [stat.ML], Aug. 29, 2012, pp. 1-12.
Li, Y. et al., "Hybrid Parallel Tempering and Simulated Annealing Method," Applied Mathematics and Computation, 212:216-228, 2009.
Ozfidan et al., "Demonstration of Nonstoquastic Hamiltonian in Coupled Superconducting Flux Qubits," arXiv:1903.06139 Nov. 8, 2019.
Ronnow et al., "Defining and Detecting Quantum Speedup," arXiv:1401. 2910v1 Jan. 13, 2014.
S, Yu and Z. Xi, "The dynamics of a hybrid system based on the NV center in spin bath," 2015 34th Chinese Control Conference (CCC), 2015, pp. 8357-8361, doi: 10.1109/ChiCC.2015.7260967. (Year: 2015).
Sendelbach, S. et al., "Magnetism in Squids at Millikelvin Temperatures," arXiv:0802.1518v1 [cond-mat.supr-con] Feb. 11, 2008, 4 pages.
Written Opinion for PCT/US2020/027532, mailed Jul. 23, 2020, 4 pages.
Boxio, et al., Computational Role of Multiqubit Tunneling in a Quantum Annealer, arXiv:1502.05754v1 [quant-ph], Feb. 20, 2015, pp. 1-7.
Brochu, et al., A Tutorial on Bayseian Optimization of Expensive Cost Functions, with Application to Active User Modeling and Hierarchical Reinforcement Learning, arXiv:1012.2599v1 [cs.LG], Dec. 12, 2010, pp. 1-49.
Burton, et al., Event-Dependent Control of Noise Enhances Learning in Neural Networks, Neural Networks, vol. 5, 1992, pp. 627-637.
Dickson, "Elimination of perturbative crossings in adiabatic quantum optimization", New Journal of Physics, 13, Jul. 11, 2011, 073011, 13pp.
Hutter, et al., "Sequential Model-Based Optimization for General Algorithm Configuration", Springer-Verlag Berlin Heidelberg, Lion 5, LNCS 6683, 2011, pp. 507-523.
Ingber, Adaptive Simulated Annealing, ASA Options, Jan. 2012, pp. 1-22.
King, et al., "Degeneracy, degree, and heavy tails in quantum annealing" Physical Review a 93, (2016) pp. 052320-1 to 052320-12 (Year:2016).
Kurihara, et al. "Quantum Annealing for Clustering", arXiv:0905. 3527v2 [cond-mat.dis-nn], May 28, 2009, pp. 1-9.
Maryak, et al., Efficient Global Optimization Using SPSA, Proceedings of the American Control Conference, San Diego, California, Jun. 1999, pp. 890-894.
Rose, et al., "An Introduction to Quantum Annealing", Dwave Technical Document 0712, Aug. 10, 2007, pp. 1-3.
Hastings, et al., "Obstructions to Classically Simulating the Quantum Adiabatic Algorithm", arXiv: 1302.5733v2 [quant-ph], Feb. 26, 2013.
Isakov, et al., "Optimised Simulated Annealing for Ising Spin Glasses", arXiv: 1401.1084v4 [cond-mat.dis-nn], Sep. 24, 2015.
Katzgraber et al., "Glassy Chimeras Could Be Blind to Quantum Speedup: Designing Better Benchmarks for Quantum Annealing Machines," Physical Review X(4):021008, 2014. (8 pages)., https://arxiv.org/abs/1401.1546.
King, Benchmarking a Quantum Annealing Processor With the Time-to-Target Metric 2015.
Nagaj, et al., "Quantum Speedup by Quantum Annealing", arXiv: 1202.6257v1 [quant-ph], Feb. 28, 2012.
Sarandy, et al., "Adiabatic Approximation in Open Quantum Systems", arXiv:quant-ph/0404147v4, Feb. 1, 2005.
Venturelli et al., Quantum Optimization of Fully-Connected Spin Glasses, arXiv:1406.7553v1 [cond-mat.dis-nn], Jun. 29, 2014.
Altshuler, et al., "Anderson localization casts clouds over adiabatic quantum optimization", arXiv:0912.0746v1 [quant-ph] Dec. 3, 2009, 14 pages.
Amin, "Effect of Local Minima on Adiabatic Quantum Optimization," arXiv:0709.0528v2, Apr. 4, 2008.
Amin, et al., "Thermally Assisted Adiabatic Quantum Computation", arXiv:cond-mat/0609332v1 [cond-mat.mes-hall] Sep. 13, 2006.
Chancellor, "Modernizing Quantum Annealing Using Local Searches", arXiv:1606.06833v1 [quant-ph] Jun. 22, 2016, 22 pages.
Crowley, et al., "Quantum and Classical in Adiabatic Computation", rXiv:1405.5185v1 [quant-ph] May 20, 2014, 9 pages.
DelaFuente Ruiz, "Quantum annealing", http://www.linkedin.com/in/alfonsofr, 2014, 21 pages.
Dickson et al., "Thermally Assisted Quantum Annealing of a 16-Qubit Problem," Nature Communications, 2013, 6 pages.
Farhi et al., "A quantum adiabatic evolution algorithm applied to random instances of an NP-Complete problem", Science, vol. 292, Apr. 20, 2001.
Farhi et al., "Quantum Adiabatic Evolution Algorithms versus Simulated Annealing," MIT-CTP #3228, arXiv:quant-ph/0201031 v1, pp. 1-16, Jan. 8, 2002.
Farhi et al., "Quantum Adiabatic Evolution Algorithms with Different Paths," arXiv:quant-ph/0208135v1, Aug. 21, 2002, 10 pages.
Farhi, et al., "Quantum Computation by Adiabatic Evolution", arXiv:quant-ph/0001106 v1 Jan. 28, 2000, 24 pages.
Friedman et al., "Quantum superposition of distinct macroscopic states," Nature 406:43-46, Jul. 6, 2000.
Garanin, et al., "Effects of nonlinear sweep in the Landau-Zener-Stueckelberg effect", Physical Review B 66, 174438 2000, 11 pages.
Hogg, "Adiabatic quantum computing for random satisfiability problems", Physical Review A 67, 022314, (2003), 7 pages.
Izmalkov, et al., "Observation of Macroscopic Landau-Zener Transitions in a Superconducting Device", Europhys. Lett., 65 (6), pp. 844-849 (2004).
Kaminsky et al., "Scalable Architecture for Adiabatic Quantum Computing of NP—Hard Problems", arXiv:quant-ph/0211152, Nov. 23, 2002.
Kaminsky et al., "Scalable Superconducting Architecture for Adiabatic Quantum Computation," arXiv.quant-ph/0403090v1, Mar. 11, 2004, 5 pages.
Kieu, "Quantum Adiabatic Computation and the Travelling Salesman Problem", arXiv:quant-ph/0601151v2, Mar. 29, 2006, 7 pages.
Lee et al., "Global Optimization: Quantum Thermal Annealing with Path Integral Monte Carlo", J. Phys. Chem. A 2000, 104,86-95.
Lee, et al., "A Renormalization Approach to Quantum Thermal Annealing", Ann. Phys (Leipzig) 9 (2000) 9-10, 668-678.
Mitchell, et al., "A Random Matrix Model of Adiabatic Quantum Computing", arXiv:quant-ph/0409088 v1 Sep. 15, 2004, 9 pages.
Morita, et al., "Quantum-thermal annealing with cluster-flip algorithm", arXiv:0903.2206v2 [cond-mat.dis-nn] Jun. 8, 2009, 4 pages.
Roland, et al., "Quantum Search by Local Adiabatic Evolution", arXiv:quant-ph/0107015v1, Jul. 3, 2001, 4 pages.
Sarandy, et al., "Adiabatic Quantum Computation in Open Systems", Physical Review Letters, PRL 95, 250503 (2005), 4 pages.
Steffen, et al., "Experimental Implementation of an Adiabatic Quantum Optimization", Physical Review Letters, vol. 90, No. 6. Feb. 14, 2003, 4 pages.
Suzuki et al., "Quantum Ferromagnetic Annealing," Physica E: Low-Dimensional Systems and Nanostructures, 40 (2):367-370, Dec. 2007.
Tanaka, et al., "Hybrid Quantum Anneal for Clustering Problems", arXiv:1104.3246v1 [cond-mat.dis-nn] Apr. 16, 2011, 24 pages.
Tian, et al., "Resonant cancellation of off-resonant effects in a multilevel qubit", Physical Review A, vol. 62, 050301 (R), 2000, 4 pages.
Tokuda, "Analog Computation Using Single-Electron Circuits", Analog Integrated Circuits and Signal Processing, Oct. 1, 2000. http://lalsie.ist.hokudai.ac.jp/publication/dlcenter.php?fn=paper/aicsp_2000_tokuda.pdf.
Vinci, et al., "Distinguishing Classical and Quantum Models for the D-Wave Device", arXiv:1403.4228v1 [quant-ph] Mar. 17, 2014, 29 pages.

* cited by examiner

SYSTEMS AND METHODS FOR OPTIMIZING ANNEALING PARAMETERS

FIELD

This disclosure generally relates to systems and methods for using quantum processors, and in particular, to systems and methods for optimizing annealing parameters for quantum computing processing.

BACKGROUND

Quantum Devices

Quantum devices are structures in which quantum mechanical effects are observable. Quantum devices include circuits in which current transport is dominated by quantum mechanical effects. Such devices include spintronics, and superconducting circuits. Both spin and superconductivity are quantum mechanical phenomena. Quantum devices can be used for measurement instruments, in computing machinery, and the like.

Quantum Computation

A quantum computer is a system that makes direct use of at least one quantum-mechanical phenomenon, such as superposition, tunneling, and entanglement, to perform operations on data. The elements of a quantum computer are qubits. Quantum computers can provide speedup for certain classes of computational problems such as computational problems simulating quantum physics.

Quantum Annealing

Quantum annealing is a computational method that may be used to find a low-energy state of a system, typically preferably the ground state of the system. Similar in concept to classical simulated annealing, the method relies on the underlying principle that natural systems tend towards lower energy states, as lower energy states are more stable. While classical annealing uses classical thermal fluctuations to guide a system to a low-energy state, quantum annealing may use quantum effects, such as quantum tunneling, as a source of delocalization to reach an energy minimum more accurately and/or more quickly than classical annealing.

A quantum processor may be designed to perform quantum annealing and/or adiabatic quantum computation. An evolution Hamiltonian can be constructed that is proportional to the sum of a first term proportional to a problem Hamiltonian and a second term proportional to a delocalization Hamiltonian, as follows:

$$H_E \propto A(t)H_P + B(t)H_D$$

where $H_E$ is the evolution Hamiltonian, $H_P$ is the problem Hamiltonian, $H_D$ is the delocalization Hamiltonian, and A(t), B(t) are coefficients that can control the rate of evolution, and typically lie in the range [0,1].

In some implementations, a time-varying envelope function can be placed on the problem Hamiltonian. A suitable delocalization Hamiltonian is given by:

$$H_D \propto -\frac{1}{2}\sum_{i=1}^{N}\Delta_i \sigma_i^x$$

where N represents the number of qubits, $\sigma_i^x$ is the Pauli x-matrix for the $i_{th}$ qubit and $\Delta_i$ is the single qubit tunnel splitting induced in the $i^{th}$ qubit. Here, the of terms are examples of "off-diagonal" terms.

A common problem Hamiltonian includes a first component proportional to diagonal single qubit terms and a second component proportional to diagonal multi-qubit terms, and may be of the following form:

$$H_P \propto -\frac{\varepsilon}{2}\left[\sum_{i=1}^{N}h_i\sigma_i^z + \sum_{j>i}^{N}J_{ij}\sigma_i^z\sigma_j^z\right]$$

where N represents the number of qubits, $\sigma_i^z$ is the Pauli z-matrix for the $i^{th}$ qubit, $h_i$ and $J_{ij}$ are dimensionless local fields for the qubits, and couplings between qubits, and $\varepsilon$ is some characteristic energy scale for $H_P$. Here, the $\sigma_i^z$ and $\sigma_i^z\sigma_j^z$ terms are examples of "diagonal" terms. The former is a single qubit term and the latter is a two qubit term.

Throughout this specification, the terms "problem Hamiltonian" and "final Hamiltonian" are used interchangeably unless the context dictates otherwise. Certain states of the quantum processor are energetically preferred, or simply preferred, by the problem Hamiltonian. These include the ground states but may include excited states.

Hamiltonians such as $H_D$ and $H_P$ in the above two equations, respectively, may be physically realized in a variety of different ways. A particular example is realized by an implementation of superconducting qubits.

Quantum Processor

A quantum processor is a computing device that can harness quantum physical phenomena (such as superposition, entanglement, and quantum tunneling) unavailable to non-quantum devices. A quantum processor may take the form of a superconducting quantum processor. A superconducting quantum processor may include a number of qubits and associated local bias devices, for instance two or more superconducting qubits. An example of a qubit is a flux qubit. A superconducting quantum processor may also employ coupling devices (i.e., "couplers") providing communicative coupling between qubits. Further details and implementations of exemplary quantum processors that may be used in conjunction with the present systems and devices are described in, for example, U.S. Pat. Nos. 7,533,068; 8,008,942; 8,195,596; 8,190,548; and 8,421,053.

Superconducting Quantum Processor for Quantum Annealing

A superconducting quantum processor can be designed for quantum annealing (and/or adiabatic quantum computing—see below) components from which may be used to implement the present systems and methods. The superconducting quantum processor can comprise a plurality of superconducting qubits and at least one coupler providing a tunable $\sigma_i^z\sigma_j^z$ coupling (diagonal coupling) between qubits.

The quantum processor can include a plurality of interfaces that are used to configure and control the state of quantum processor. Each of the interfaces can be realized by a respective inductive coupling structure, as part of a programming subsystem and/or an evolution subsystem.

In the operation of the quantum processor, interfaces can be used to couple a flux signal into a respective compound Josephson junction of the qubits, thereby realizing a tunable tunneling term (the A/term) in the system Hamiltonian. This coupling provides the off-diagonal $\sigma^x$ terms of the Hamiltonian and these flux signals are examples of "delocalization signals".

Similarly, interfaces can be used to apply a flux signal into a respective qubit loop of the qubits, thereby realizing the $h_i$ terms in the system Hamiltonian. This coupling provides the diagonal $\sigma^z$ terms in the system Hamiltonian. Furthermore, an interface can be used to couple a flux signal into a coupler, thereby realizing the $J_{ij}$ term(s) in the system Hamiltonian. This coupling provides the diagonal $\sigma_i^z \sigma_j^z$ terms in the system Hamiltonian.

The quantum processor can include readout devices to read out the final states of the qubits. Examples of superconducting qubits include superconducting flux qubits, superconducting charge qubits, and the like.

Adiabatic Quantum Computing

One model of quantum computing is adiabatic quantum computing. Adiabatic quantum computing can be suitable for solving hard optimization problems, for example. Adiabatic quantum computing may be considered a special case of quantum annealing. In adiabatic quantum computation, the system ideally begins and remains in its ground state throughout an adiabatic evolution. Those of skill in the art will appreciate that quantum annealing systems and methods may generally be implemented on an adiabatic quantum computer.

Adiabatic Quantum Computation

A Hamiltonian is an operator whose eigenvalues are the allowed energies of the system. Adiabatic quantum computation can include evolving a system from an initial Hamiltonian to a final Hamiltonian by a gradual change. One example of adiabatic evolution is a linear interpolation between the initial Hamiltonian $H_i$ and the final Hamiltonian $H_f$, as follows:

$$H_e = (1-s)H_i + sH_f$$

where $H_e$ is the evolution, or instantaneous, Hamiltonian, and s is an evolution coefficient that can control the rate of evolution.

As the system evolves, the evolution coefficient s changes value from 0 to 1. At the start, the evolution Hamiltonian $H_e$ is equal to the initial Hamiltonian $H_i$, and, at the end, the evolution Hamiltonian $H_e$ is equal to the final Hamiltonian $H_f$.

The system is typically initialized in a ground state of the initial Hamiltonian $H_i$, and the goal of the adiabatic evolution is to evolve the system such that the system ends up in a ground state of the final Hamiltonian $H_f$ at the end of the evolution. If the evolution is too fast, the system can transition to a higher energy state of the system, such as the first excited state.

The process of changing the Hamiltonian in adiabatic quantum computing may be referred to as evolution. An adiabatic evolution is an evolution that satisfies an adiabatic condition such as:

$$|\dot{s}| < 1 |dH_e/ds|0\rangle| = \delta g^2(s)$$

where $\dot{s}$ is the time derivative of s, g(s) is the difference in energy between the ground state and first excited state of the system (also referred to herein as the gap size) as a function of s, and $\delta$ is a coefficient and $\delta \ll 1$.

If the rate of change (for example, s) is slow enough that the system is always in the instantaneous ground state of the evolution Hamiltonian, transitions at anticrossings (i.e., when the gap size is smallest) are avoided. Equation (4) above is an example of a linear evolution schedule. Other evolution schedules can be used, including non-linear, parametric, and the like. Further details on adiabatic quantum computing systems, methods, and apparatus are described in, for example, U.S. Pat. Nos. 7,135,701; and 7,418,283.

Machine Learning

Machine learning relates to methods and circuitry that can learn from data and make predictions based on data. In contrast to methods or circuitry that follow static program instructions, machine learning methods and circuitry can include deriving a model from example inputs (such as a training set) and using that model to make data-driven predictions. Machine learning tasks can include unsupervised learning, supervised learning, and reinforcement learning. Approaches to machine learning include, but are not limited to, decision trees, linear and quadratic classifiers, case-based reasoning, Bayesian statistics, and artificial neural networks.

Some problems can be expressed in terms of minimizing a loss function on a training set, where the loss function describes the disparity between the predictions of the model being trained and observable data. Example application areas include optical character recognition, search engine optimization, and computer vision.

Hybrid Computing System Comprising a Quantum Processor

A hybrid computing system can include a digital computer communicatively coupled to an analog computer. In some implementations, the analog computer is a quantum computer and the digital computer is a classical computer.

The digital computer can include a digital processor that can be used to perform classical digital processing tasks described in the present systems and methods. The digital computer can include at least one system memory which can be used to store various sets of instructions, application programs, and/or data that are readable by a computer or processor.

The quantum computer can include a quantum processor that includes programmable elements such as qubits, couplers, and other devices. The qubits can be read out via a readout system, and the results communicated to the digital computer. The qubits and the couplers can be controlled by a qubit control system and a coupler control system, respectively. In some implementations, the qubit and the coupler control systems can be used to implement quantum annealing on the analog computer.

Superconducting Processor

A quantum processor may take the form of a superconducting processor. However, superconducting processors may include processors that are not intended for quantum computing. For instance, some implementations of a superconducting processor may not focus on quantum effects such as quantum tunneling, superposition, and entanglement but may rather operate by emphasizing different principles, such as for example the principles that govern the operation of classical computer processors. However, there may still be certain advantages to the implementation of such superconducting "classical" processors. Due to their natural physical properties, superconducting classical processors may be capable of higher switching speeds and shorter computation times than non-superconducting processors, and it may be more practical to solve certain problems on superconducting classical processors.

Superconducting Qubits

Superconducting qubits are a type of superconducting quantum device that may be included in a superconducting integrated circuit. Superconducting qubits may be separated into several categories depending on the physical property used to encode information. For example, superconducting qubits may be separated into charge, flux and phase devices. Charge devices store and manipulate information in the charge states of the device. Flux devices store and manipulate information in a variable related to the magnetic flux through some part of the device. Phase devices store and manipulate information in a variable related to the difference in superconducting phase between two regions of the device.

Recently, hybrid devices using two or more of charge, flux and phase degrees of freedom have been developed. Superconducting qubits commonly include at least one Josephson junction. A Josephson junction is a small interruption in an otherwise continuous superconducting current path and is typically realized by a thin insulating barrier sandwiched between two superconducting electrodes. Thus, a Josephson junction is usually formed as a three-layer or "trilayer" structure. Superconducting qubits are further described in, for example, U.S. Pat. Nos. 7,876,248, 8,035,540, and 8,098,179.

Markov Chain Monte Carlo

Markov Chain Monte Carlo (MCMC) is a class of computational techniques which include, for example, simulated annealing, parallel tempering, population annealing, and other techniques. A Markov chain may be used, for example when a probability distribution cannot be used. A Markov chain may be described as a sequence of discrete random variables, and/or as a random process where at each time step the state only depends on the previous state. When the chain is long enough, aggregate properties of the chain, such as the mean, can match aggregate properties of a target distribution.

The Markov chain can be obtained by proposing a new point according to a Markovian proposal process (generally referred to as an "update operation"). The new point is either accepted or rejected. If the new point is rejected, a new proposal is made, and so on. New points that are accepted are ones that make for a probabilistic convergence to the target distribution. Convergence is guaranteed if the proposal and acceptance criteria satisfy detailed balance conditions and the proposal satisfies the ergodicity requirement. Further, the acceptance of a proposal can be done such that the Markov chain is reversible, i.e., the product of transition rates over a closed loop of states in the chain is the same in either direction. A reversible Markov chain is also referred to as having detailed balance. Typically, in many cases, the new point is local to the previous point.

The foregoing examples of the related art and limitations related thereto are intended to be illustrative and not exclusive. Other limitations of the related art will become apparent to those of skill in the art upon a reading of the specification and a study of the drawings.

BRIEF SUMMARY

According to an aspect, there is provided method of adjusting a quantum annealing schedule for a computational problem, the method being performed by one or more processors, the method comprising receiving a representation of the computational problem, the representation comprising a plurality of problem values, transforming the plurality of problem values based on a plurality of trained parameters of a machine learning model to generate at least a portion of an annealing schedule comprising at least one annealing parameter, and transmitting instructions to a quantum processor to cause the quantum processor to evolve from an initial state to a final state based on the computational problem and the at least a portion of an annealing schedule, wherein the final state provides a result for the computational problem.

According to other aspects, transforming the plurality of problem values based on a plurality of trained parameters of a machine learning model to generate at least a portion of an annealing schedule comprising at least one annealing parameter may comprise generating one or more of: annealing offsets, annealing speed, and timing and duration of annealing pauses, or may comprise generating multiple annealing parameters to form an annealing schedule, receiving a representation of the computation problem, the representation comprising a plurality of problem values, may comprise receiving problem values comprising qubit and coupler parameters corresponding to the computational problem, transforming the plurality of problem values based on a plurality of trained parameters of a machine learning model to generate at least a portion of an annealing schedule comprising at least one annealing parameter may comprise generating an annealing parameter that determines the annealing schedule for at least one qubit, receiving a representation of the computation problem may comprise receiving a representation of a computational problem comprising a problem Hamiltonian, transmitting instructions to the quantum processor to cause the quantum processor to evolve from an initial state to a final state based on the computational problem and the at least a portion of an annealing schedule may further comprise transmitting instructions to the quantum processor to cause the quantum processor to evolve from the problem Hamiltonian state to a result Hamiltonian state, the method may further comprise receiving a default annealing schedule, and transforming the plurality of problem values based on a plurality of trained parameters of a machine learning model to generate at least a portion of an annealing schedule comprising at least one annealing parameter may comprise modifying the default annealing schedule based on the at least one annealing parameter to generate the at least a portion of an annealing schedule, receiving a default annealing schedule may comprise receiving one or more default annealing parameters comprising one or more of: default annealing offsets, default annealing speed, and default timing and duration of annealing pauses, the method may further comprise receiving result data generated by causing the quantum processor to evolve from an initial state to a final state based on the computational problem and the default annealing schedule, and transforming the plurality of problem values based on a plurality of trained parameters of a machine learning model to generate at least a portion of an annealing schedule comprising at least one annealing parameter may comprise transforming the plurality of problem values and the result data to generate at least a portion of an annealing schedule comprising at least one annealing parameter, transforming the plurality of problem values based on a plurality of trained parameters of a machine learning model to generate at least a portion of an annealing schedule may comprise transforming the plurality of problem values based on a plurality of trained parameters of a machine learning model comprising a trained neural network, transforming the plurality of problem values based on a plurality of trained parameters of a machine learning model to generate at least a portion of an annealing schedule comprising at least one annealing parameter may further comprise generating at least a portion of an annealing schedule comprising at least one annealing offset parameter and at least one annealing offset compensation coefficient, and transmitting instructions to the quantum processor may further comprises transmitting annealing offset compensation coefficients, to thereby cause the quantum processor to update the computational problem with the annealing offset compensation coefficients to generate an updated computational problem, and to thereby cause the quantum processor to evolve from an initial state to a final state based on the updated computational problem and the at least a portion of an annealing schedule.

According to an aspect, there is provided a system for use in quantum processing, comprising at least one non-transitory processor-readable medium that stores at least one of processor executable instructions and data and at least one processor communicatively coupled to the least one non-transitory processor-readable medium and a quantum processor, and which, in response to execution of the at least one of processor executable instructions and data receives a representation of a computation problem, the representation comprising a plurality of problem values, transforms the plurality of problem values based on a plurality of trained parameters of a machine learning model to generate at least a portion of an annealing schedule comprising at least one annealing parameter, and transmits instructions to the quantum processor, that cause the quantum processor to evolve from an initial state to a final state based on the computational problem and the at least a portion of an annealing schedule, wherein the final state provides a result for the computational problem.

According to other aspects the at least one annealing parameter may comprise one or more of: annealing offsets, annealing speed, and timing and duration of annealing pauses, the machine learning model may be trained to generate multiple annealing parameters to form an annealing schedule, the plurality of problem values may comprise qubit and coupler parameters corresponding to the computational problem, the at least one annealing parameter may comprise an annealing parameter that determines the annealing schedule for at least one qubit, the representation of a computational problem may comprise a representation of a problem Hamiltonian, the result for the computational problem may comprise a result Hamiltonian, in response to execution of the at least one of processor executable instructions and data, the at least one processor may receive a default annealing schedule, and may transmit instructions to the quantum processor to modify the default annealing schedule based on the at least one annealing parameter to generate the at least a portion of an annealing schedule, the default annealing schedule may comprise one or more default annealing parameters comprising one or more of: default annealing offsets, default annealing speed, and default timing and duration of annealing pauses, in response to execution of the at least one of processor executable instructions and data, the at least one processor may receive result data generated by the quantum processor evolving from an initial state to a final state based on the computational problem and the default annealing schedule, and the processor may transform the plurality of problem values and the result data to generate the at least a portion of an annealing schedule comprising the at least one annealing parameter, the machine learning model may comprise a trained neural network, the at least a portion of an annealing schedule may comprise at least one annealing offset parameter and at least one annealing offset compensation coefficient, and in response to execution of the at least one of processor executable instructions and data, the processor may transmit instructions to the quantum processor to update the computational problem with the annealing offset compensation coefficients to generate an updated computational problem, which instructions cause the quantum processor to evolve from an initial state to a final state based on the updated computational problem and the at least a portion of an annealing schedule to produce the result for the computational problem.

In other aspects, the features described above may be combined in any reasonable combination as will be recognized by those skilled in the art.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements and may have been solely selected for ease of recognition in the drawings.

DETAILED DESCRIPTION

Figure 1:
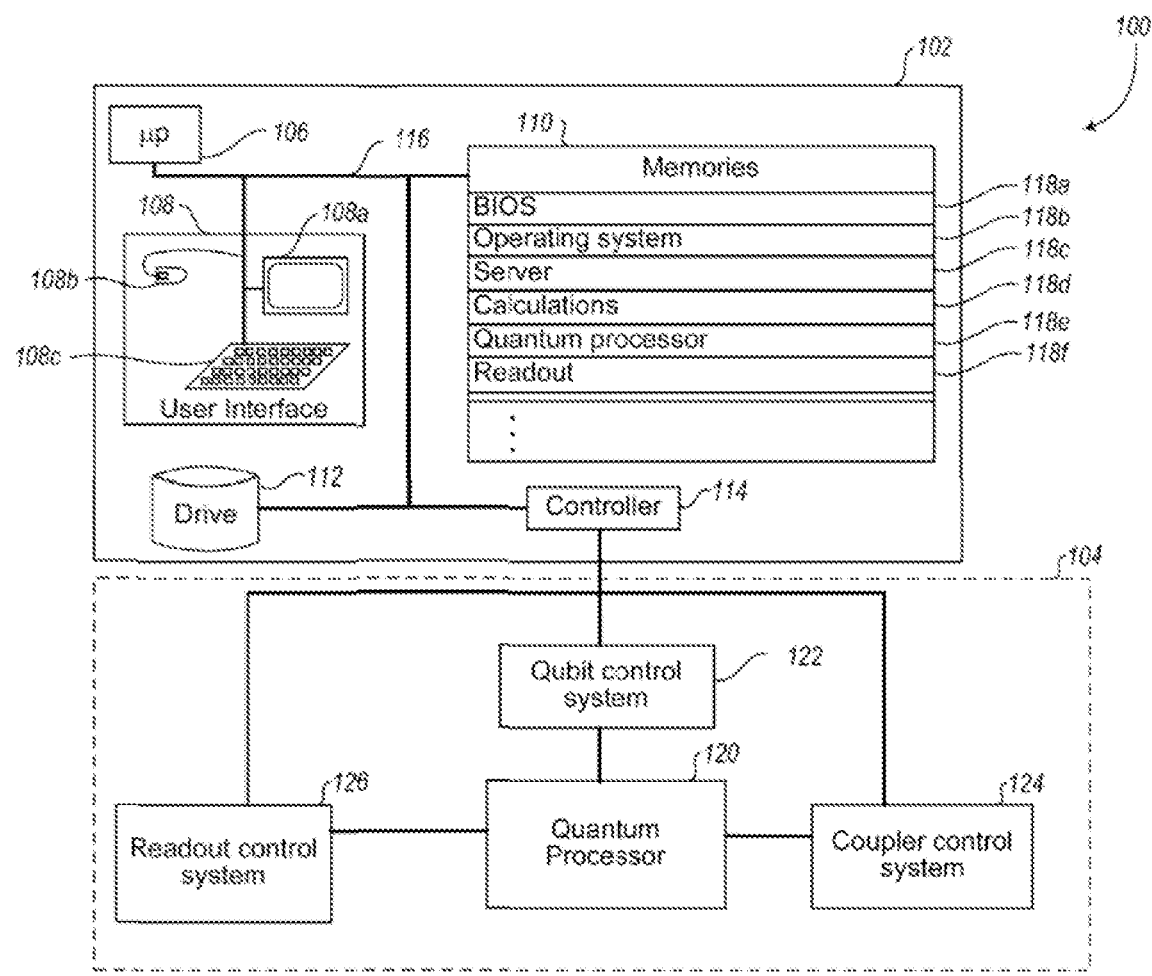
FIG. 1 is a schematic diagram illustrating a computing system comprising a digital computer and an analog computer that includes a superconducting integrated circuit, in accordance with the present systems and methods.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

Quantum Annealing Schedule

As discussed above, quantum annealing is a process of moving a system from an initial disordered state to a final state that corresponds to a solution to a given problem Hamiltonian. When performing quantum annealing using a quantum processor (also referred to herein as a Quantum Processing Unit (QPU)), many parameters may be used to determine the annealing path (also referred to herein as the annealing schedule), including the per qubit annealing offsets, the presence, timing, and durations of any pauses during the annealing, the rate of annealing in different segments of the evolution, etc.

For each problem there are many parameters that may be used to determine the annealing path, and many different potential combinations of these parameters, resulting in an enormous number of potential annealing paths to asses. Compounding the challenge, qubits have complex physical relationships that may be significantly altered by the choice of annealing path, and it can be impractical to predict the effect of a particular annealing path. The choice of annealing path can have a significant effect on the performance of the quantum processor. Thus, determining an annealing path which is likely to improve the performance of the quantum processor is a challenging problem.

For example, during quantum annealing, individual qubits may evolve at different rates, and "freeze out" or stop changing at different times. This results in the qubit no longer contributing to the dynamics, and further, may result in the qubit hindering progress. As discussed in United States Patent Application Publication No. 2018/0330264, it may be desirable to provide individual annealing offsets to each qubit to homogenize the freeze out times. While these parameters do not relate directly to the problem Hamiltonian, it has been found that they can significantly affect the success probability and efficiency of the QPU. In addition, varying these parameters may also result in a need to rescale the $h_i$ and $J_{ij}$ of the function, particularly for high precision problems. Due, at least in part, to the number of parameters involved in the quantum annealing process, determining optimal values of these parameters for every problem is a significant challenge. Where a per-problem annealing path is not known, annealing may be performed using a default annealing path, the default annealing path typically being an annealing schedule having no pause and no annealing offset.

The techniques disclosed hereinafter may, in suitable circumstances, improve the operation of a quantum processor by more efficiently generating per-problem annealing paths.

Exemplary Hybrid Computing System

The methods described in further detail below may, for example, be performed on a hybrid computing system. FIG. 1 shows a hybrid computing system 100 according to at least one exemplary implementation, including a classical or digital computer 102 and a quantum computer 104, which may incorporate various logic devices and/or implement various addressing approaches described herein.

Digital computer 102 comprises one or more digital processors 106, for example one or more single- or multicore microprocessors, central processor units (CPU), graphical processor units (GPUs), digital signal processors (DSPs), field-programmable gate arrays (FPGAs), or application specific integrated circuits (ASICs). The digital computer 102 may include one or more user interface components, for example one or more displays 108a, pointer devices 108b (e.g., computer mouse, trackpad), and keypads or keyboards 108c, collectively 108. The digital computer 102 may include one or more nontransitory computer- or processor-readable media, for example one or more memories (e.g., volatile memory, static memory, read only memory (ROM), random access memory (RAM)) 110 and/or one or more storage devices (e.g., magnetic hard disk drives (HDDs), optical disk drives, solid state drives (SSD), and/or Flash drives) 112. The digital computer 102 may include one or more quantum computer control subsystems 114 that interfaces with the quantum computer 104. The processor(s) 106, memories 110, storage 112 and quantum computer control subsystems 114 may be communicatively coupled via one or more communications channels, for instance one or more buses (e.g., power buses, communications buses, instruction buses, address buses) 116.

The nontransitory computer- or processor-readable media, for example one or more memories 110, stores processor-executable instructions and data, which when executed by one or more processors 106, cause the processors 106 to execute one or more of the various algorithms described herein. The processor-executable instructions and data may, for example, include a basic input and output system set of instructions or "module" 118a that configure the digital computer 102 for operation on boot up. The processor-executable instructions and data may, for example, include an operating system set of instructions or "module" 118b which configures the digital computer 102 for operation, for instance providing various file management services and user interface services. The processor-executable instructions and data may, for example, include a server set of instructions or "module" 118c which configures the digital computer 102 for operation as a server to provide access by other computers to information and services. The processor-executable instructions and data may, for example, include a "calculations" set of instructions or "module" 118d which configures the digital computer 102 to perform various calculations associated with converting problems into a problem graph and/or post-processing of potential solutions generated by the quantum computer 104. The processor-executable instructions and data may, for example, include a quantum processor set of instructions or "module" 118d which configures the digital computer 102 to map problems from a problem graph to a hardware graph for embedding in a quantum processor 120 of the quantum computer 104 for execution. The processor-executable instructions and data may, for example, include a read out set of instructions or "module" 118f which configures the digital computer 102 to perform various read out functions associated with reading out potential solutions to problems from the quantum computer 104.

The quantum computer 104 includes quantum processor 120, which typically includes a plurality of qubits and a plurality of couplers, each coupler selectively operable to couple a respective pair of the qubits. Quantum computer 104 also includes a qubit control system 122, operatively coupled to control each of the qubits, for example via various interfaces, i.e., inductive interfaces that selectively couple a flux to the qubit. The quantum computer 104 includes a coupler control system 124, operatively coupled to control each of the couplers, for example via various interfaces, i.e., inductive interfaces that selectively couple a flux to the coupler to set a strength of coupling or "coupling strength" of the coupler. The quantum computer 104 includes a read-out control system 126, operatively coupled to control various interfaces operable to read out a state of each of the qubits.

Various respective systems, components, structures and algorithms for implementing such are described herein. Many of the described systems, components, structures and algorithms may be implemented individually, while some may be implemented in combination with one another.

Method of Selection of Annealing Parameters

As discussed above, the selection of annealing parameters for a quantum annealing problem on a per-problem basis may be challenging. In some implementations, hybrid computing system 100 preprocesses the problem to determine a set of annealing parameters for the problem via supervised or semi-supervised machine learning techniques as described herein. The model may be trained based on problem parameters, such as the $h_i$ and $J_{ij}$ of the function, and their corresponding annealing parameters, and, once trained, may be used to suggest an appropriate annealing path for a new problem.

Figure 2:
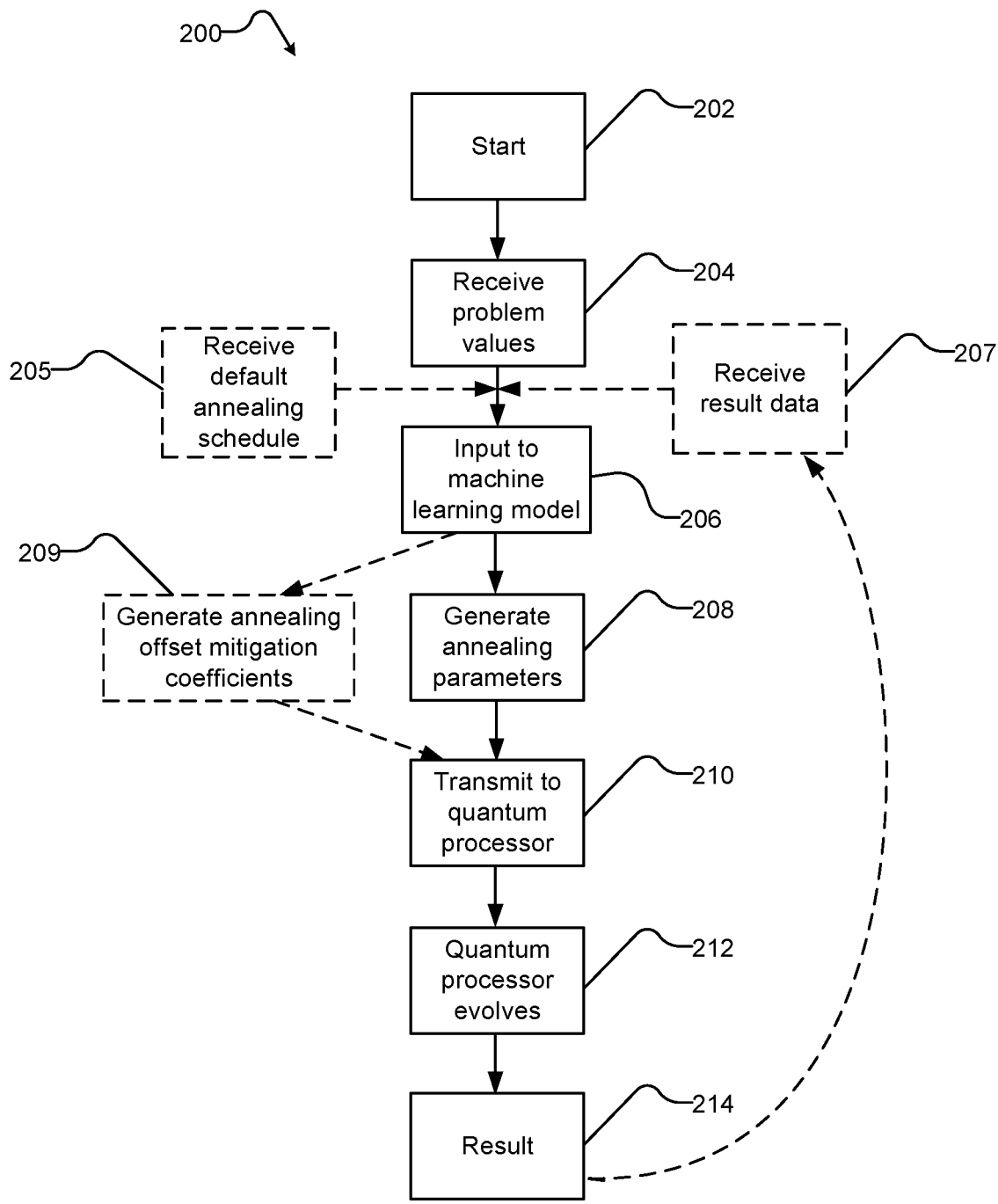
FIG. 2 is a flowchart illustrating a method of adjusting a quantum annealing schedule.

Referring to FIG. 2, a method 200 of adjusting a quantum annealing schedule for a computational problem is shown. The method is performed by one or more processors, for example, as discussed above with respect to FIG. 1. The method 200 starts at 202, for example in response to application of power, submission of a problem, a request or an invocation, for example by a calling routine or program. At 204, the processor receives a representation of the computational problem. The representation includes a plurality of problem values. The problem values may vary based on the nature of the problem. In some implementations, the problem values may be qubit and coupler parameters corresponding to the computational problem. The problem values may be submitted by a user or may be transmitted by a quantum processor after a problem is embedded. In some implementations, the representation of the computation problem may be a representation of a problem Hamiltonian. In some implementations, the problem values may be the $h_i$ and $J_{ij}$ values of the problem Hamiltonian.

At 206, a machine learning model receives the plurality of problem values and transforms the plurality of problem values based on a plurality of trained parameters of the machine learning model. Specific implementations of the machine learning model are discussed in greater detail below. Exemplary implementations of machine learning models include trained neural networks, convolutional neural networks, variational autoencoders, adversarial networks, other forms of trained neural networks, and/or other machine learning models. The machine learning model generates at least one annealing parameter at 208, which makes up at least a portion of an annealing schedule. The at least one annealing parameter may, for example, be one or more of: annealing offset, annealing speed, and timing and duration of one or more annealing pauses. The definition of a complete annealing schedule may vary based on the problem type and application. For example, a complete annealing schedule might comprise only an annealing speed, without necessarily requiring further parameters. Alternatively, a complete annealing schedule might comprise an annealing offset for each qubit, with some qubits potentially being assigned no offset or a default offset, an annealing speed, and a timing and duration for one or more annealing pauses. The complete annealing schedule may have other combinations of these and/or other elements. In some implementations, the machine learning model may generate multiple annealing parameters at 208 to form an annealing schedule. The at least one annealing parameter may comprise an annealing parameter that determines the annealing schedule for at least one qubit. For example, the annealing parameter may be an annealing offset for at least one qubit.

In some implementations, the method may include receiving a default annealing schedule at 205 and generating annealing parameters at 208 may include modifying the default annealing schedule based on the at least one annealing parameter to generate the at least a portion of an annealing schedule. The default annealing schedule may include one or more default annealing parameters, and may include one or more of: default annealing offsets, default annealing speed, and default timing and duration of annealing pauses. A typical default annealing path would be an annealing schedule at a single annealing speed having no pause and no annealing offset.

In addition to the problem values, the machine learning model may also be trained to use additional inputs. In some implementations, the method may include receiving result data generated by causing the quantum processor to evolve from an initial state to a final state based on the computational problem, prior to generating the annealing schedule, as shown at 207. In some implementations, the quantum processor may be caused to evolve based on the default annealing schedule. By evolving the quantum processor once, the quantum processor may produce result data, such as correlation information, a potential solution to the computational problem, or a set of potential solutions to the computational problem, that can be used in determining factors such as annealing offsets. The result data from this evolution using the default schedule may be used as input into the machine learning model. In this implementation, the plurality of problem values and the result data are used in combination to generate the at least a portion of an annealing schedule comprising at least one annealing parameter. For example, instead of transforming only the $h_i$ and $J_{ij}$ of a problem Hamiltonian to generate annealing parameters, the problem with those $h_i$ and $J_{ij}$ values may be run at least once to generate data that allows for additional information to be provided to the machine learning model, such that the $h_i$ and $J_{ij}$ and the result data are transformed to obtain annealing parameters. In some implementations, the quantum processor may be evolved multiple times to generate result data. Result data may be generated for the training set, and the processor may transform the result data and the problem values based on the machine learning model to generate the annealing parameters.

In some implementations, the generation of results data from the evolution of the quantum processor may be performed multiple times in an iterative process. The quantum processor may be allowed to evolve based on a default annealing schedule to generate some results data, and this results data may be used to generate at least a portion of an annealing schedule using the machine learning model. The quantum processor may then be allowed to evolve based on the at least a portion of an annealing schedule to generate new results data, which may then be used to generate at least a portion of an annealing schedule using the machine learning model. In some implementations this iterative process may be repeated multiple times. Other acts may also be taken as part of the iterative process, such as further training of the machine learning model based on the new results data and the training data.

In some implementations, the training of the machine learning model may also use reinforcement learning. Reinforcement learning may be applied to different techniques for training the model, such as those discussed above. In some implementations, reinforcement may be implemented to penalize the generation of portions of annealing schedules that do not improve performance, and reward portions of an annealing schedule that are generated that are found to improve performance. In other implementations, reinforcement may be implemented to provide penalties and rewards based on a measure of the quality of the solution generated.

At 210, the processor transmits instructions to the quantum processor to cause the quantum processor to evolve from an initial state to a final state at 212 based on the computational problem and the at least a portion of an annealing schedule generated at 208, the final state producing a result for the computational problem at 214. In some implementations, the result produced at 214 may be a result Hamiltonian. In some implementations, the result produced at 214 may be a low energy state of the problem Hamiltonian that encodes a solution to the computational problem. In some implementations the quantum processor may evolve from a problem Hamiltonian state to a result Hamiltonian state.

Annealing Offset Compensation Coefficients

Annealing offsets may be implemented as individual shifts in the schedules of different qubits. In some implementations, the annealing schedule of individual qubits may not be directly controllable and other variables may also be altered by the introduction of annealing offsets. In some implementations, individual physical qubits may be coupled to form a logical qubit, and annealing offsets may be introduced by coupling to control qubits that serve to change the annealing schedule for that logical qubit. However, this may also impact the definition of the problem and in the case of sensitive problems, may impact the resulting solution.

In some implementations, the processor may generate annealing offset compensation coefficients and amend the computational problem to generate an updated computational problem. The quantum processor may evolve from an initial state to a final state based on the updated computational problem and the at least a portion of an annealing schedule. In the exemplary implementation of FIG. 2, at 209 the processor may generate annealing offset mitigation coefficients by executing the machine learning model based on the model's trained parameters, the processor transmitting the annealing offset mitigation coefficients to the quantum processor at 210.

In an exemplary implementation, the QPU may implement a transverse field Ising Hamiltonian as follows:

$$H(s) = -A(s)\sum_i \sigma_i^x + B(s)H_p$$

with $$H_p = \sum_i h_i \sigma_i^z + \sum_{i,j} J_{ij}\sigma_i^z\sigma_j^z$$

In some implementations A(s) may be controllable directly, in order to change the annealing path for different qubits without affecting the problem Hamiltonian $H_p$. In other implementations, annealing offsets are provided by shifting the schedules for different qubits by controlling their current. As the coefficients $h_i$ and $J_{ij}$ of the problem Hamiltonian may have a dependence on the persistent current of the qubits, this may result in the Hamiltonian being modified by the introduced annealing offsets. For example, a modified problem may be:

$$H(s) = -A(s)\sum_i a_i \sigma_i^x + B(s)\tilde{H}_p$$

with $$\tilde{H}_p = \sum_i b_i h_i \sigma_i^z + \sum_{i,j} \sqrt{b_i b_j} J_{ij}\sigma_i^z\sigma_j^z$$

As such, the resulting problem Hamiltonian $H_p$ differs from the original problem Hamiltonian. In some implementations, such as high precision problems, this may impact the results. In order to address this issue, scaling factors for $h_i$ and $J_{ij}$ may be introduced to compensate for the change (also referred to herein as annealing offset compensation coefficients). These scaling factors may, for example, be proportional to the coefficients in the modified problem as follows:

$$h_i \propto 1/b_i, J_{ij} \propto 1/\sqrt{b_i b_j}.$$

However, as these values will depend on the annealing schedule for each individual qubit, they are non-trivial to determine. In some implementations, the parameters of the machine learning model are trained to provide these annealing offset compensation coefficients for each problem. As discussed below, the training data for these coefficients may be generated using known methods such as Monte Carlo techniques.

Exemplary Annealing Schedule

Figure 3:
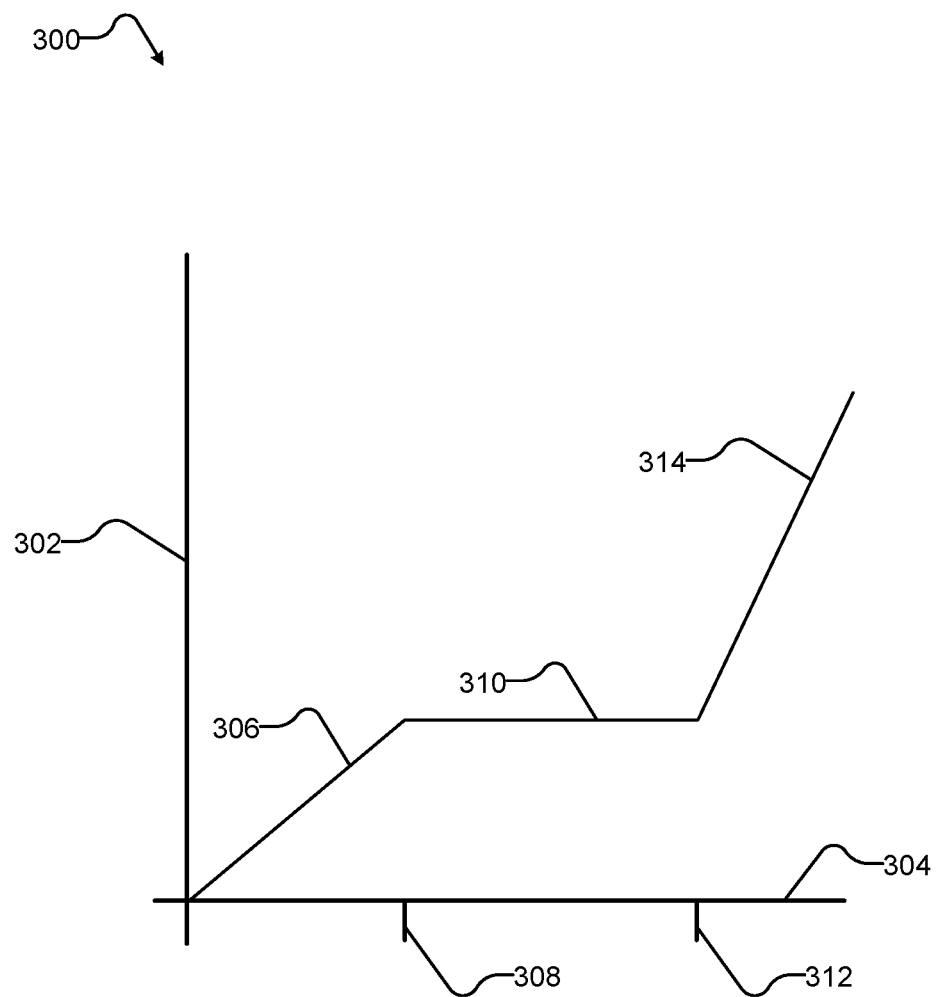
FIG. 3 is a representative graph illustrating an example annealing schedule.

Referring to FIG. 3, an example annealing schedule 300 is shown. In the example implementation of FIG. 3, axis 302 represents annealing progress and axis 304 represents annealing time. Annealing schedule 300 has a first portion 306 that proceeds at a first rate. At time 308 a second portion 310 corresponding to a pause begins in annealing schedule 300. The duration of pause 310 is such that annealing proceeds at time 312. At time 312, annealing schedule 300 has a third portion 314 during which annealing proceeds at a second rate until completion. As shown, the second rate of third portion 314 is greater than that of the first rate of first portion 306. As discussed herein, annealing parameters forming exemplary annealing schedule 300 would include the timing of pause 310, including, for example a start 308 of pause 310 and a duration (between 308 and 312) of pause 310, the rate of first portion 306, and the rate of third portion 314. It will be understood that there may be no annealing pause, or multiple annealing pauses. It will be further understood that the rate of annealing may change without a pause, and that the rate may change multiple times during the annealing or may be constant throughout the annealing. Further, it will be understood that the annealing schedule may include parameters for individual qubits, separately or in addition to the parameters for the overall annealing schedule. For example, where an annealing schedule is created for individual qubits, some qubits may have annealing schedules having annealing offsets such that those qubits start their annealing schedule later along axis 304 than other qubits.

Machine Learning Model

As discussed above, the method involves transforming problem values using a machine learning model based on a plurality of trained parameters of the machine learning model. The trained parameters are used to generate at least one annealing parameter by transforming the problem values. Training of the machine learning model is performed based on training data, which may comprise problems and associated annealing parameters which have been found to, or are expected to, improve the performance of the quantum processor when executing the associated problem. Such training data may be obtained in any suitable manner, e.g., provided by a user, generated using Monte Carlo techniques, and/or otherwise obtained, such as discussed in U.S. Patent Application Publication Number 2018/0330264

Other techniques for determining improved annealing parameters include the use of feedback obtained from samples generated by performing annealing on the QPU. Examples of these techniques are discussed in Dickson and Amin (*Algorithmic approach to adiabatic quantum optimization*. Phys. Rev. A 85, 032303 (2012)), which discusses the use of an adiabatic quantum algorithm to provide annealing parameters that penalize annealing paths to clusters of local minima, and Lanting et al. (*Experimental demonstration of perturbative anticrossing mitigation using nonuniform driver Hamiltonians*. Phys. Rev. A 96, 042322 (2017)), which discusses tuning annealing offsets to reduce the occurrence of perturbative anticrossings. These and other methods may be employed in generating training data.

The determined improved annealing parameters may be used to form a training set and may also be used to form a validation set. The training set can be used to train the machine learning model to predict the improved parameters for a given problem. In some implementations a different training set is developed, and the machine learning model is trained separately, for each group of problems within a classification or category. In suitable circumstances, training a machine learning model based on a specific type of problem may provide superior performance on that particular type of problem relative to a model that is trained over a wider variety of problems. In some implementations, the model may be trained on a subset of problems corresponding to a given group of problems. For example, a training set may be created, and a model may be trained to select annealing parameters for lattice modelling problems, or for traffic flow optimization problems. In some implementations, a portion of the problems from the problem set can be selected as the training set, and other problems may be selected as a validation set.

As discussed above, some of the training may be performed through evolution of the quantum processor and comparison of results data to the measure of solution quality or other features of the annealing in an iterative manner. Training may also rely on reinforcement learning to penalize or reward based on the quality of solutions generated after annealing with generated annealing parameters.

Figure 4:
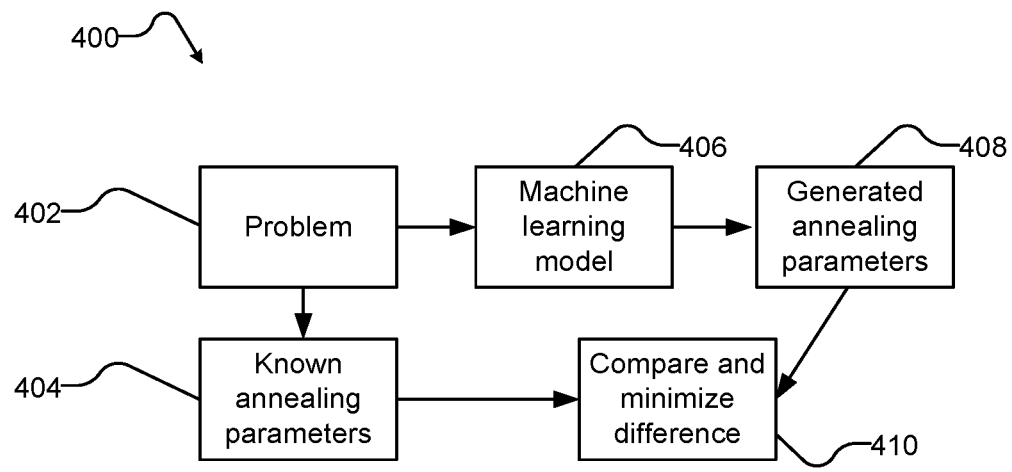
FIG. 4 is a flowchart illustrating a method of training a machine learning model.

Referring to FIG. 4, an exemplary method 400 for training the parameters of a machine learning model is shown. In the method, problems 402 from the training data have known annealing parameters 404 developed in the creation of the training data as discussed above. The machine learning model 406 receives problems 402 and generates annealing parameter values 408. These values are compared to known annealing parameter values 404, and a difference between the known annealing parameters 404 and the generated annealing parameters 408 is determined at 410. In some implementations, this is done by forming an objective function and minimizing the objective function through techniques such as gradient descent. The objective function may comprise, for example, an L1 (pairwise error) or L2 (least squares error) distance between the predicted parameters 408 and the values of the known annealing parameters 404 of the training set.

After training the model, validation of the performance of the model may be performed prior to proceeding with using the model. In some implementations, a portion of the training data may be selected for the training stage, and the other portion may be used for validation of the machine learning model. In this case, once the training is completed, the performance of the machine learning model using the validation data is evaluated. In some implementations, validation may be performed on the machine learning model using a second set of validation problems. In some implementations, the improved annealing parameters may be determined for the validation set in a similar method to those for the training set, as discussed above. In this case, the parameters generated by the machine learning model will be compared to the parameters in the validation set in order to validate the machine learning model. The same L1 or L2 distance can be used to examine the performance of the network on the validation set, providing a measure or representation of solution quality.

Figure 5:
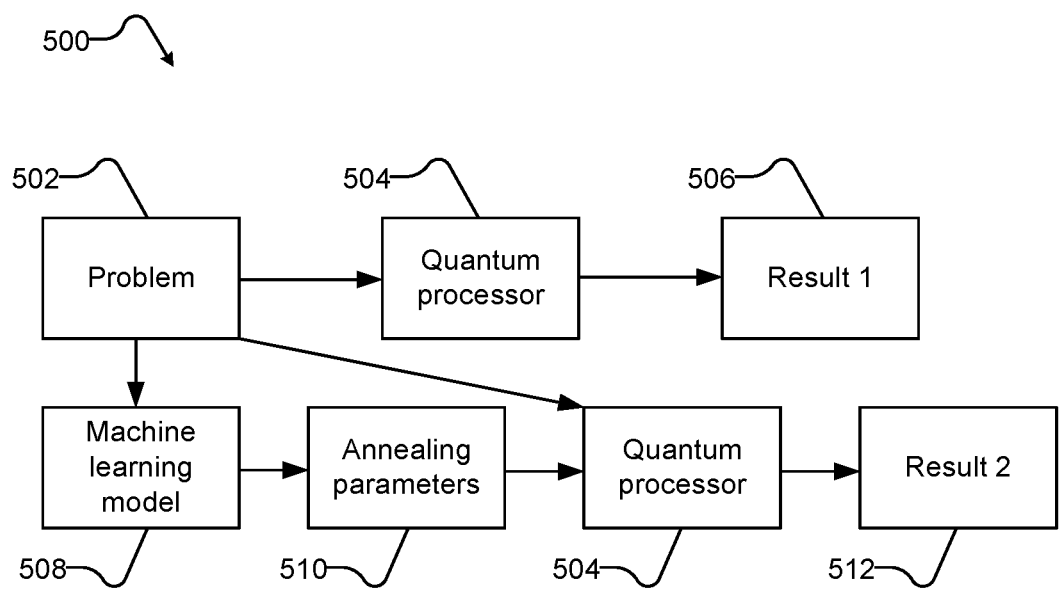
FIG. 5 is a flowchart illustrating a method of validating a trained machine learning model.

Generating the annealing parameters for the validation set can require considerable resources. In some implementations, the validation set is provided as a set of problems, without necessarily including improved annealing parameters. Testing may be performed using the quantum processor. In some implementations, once the machine learning model generates parameters, performance of the QPU on a default annealing schedule and the generated annealing schedule may be compared to confirm that the machine learning model has provided improved parameters. One implementation of such an alternative or additional approach to validation is shown in FIG. 5. In method 500, the performance of the quantum processor on a standard annealing schedule is compared to the performance of the quantum processor using the generated annealing parameters. Problem 502 is provided directly to quantum processor 504 to produce Result 1 at 506 using the default annealing schedule. Problem 502 is also provided to machine learning model 508 to generate annealing parameters 510 particular to problem 502. Problem 502 and annealing parameters 510 are transmitted to quantum processor 504 to produce Result 2 at 512. Result 1 may be compared to Result 2 to determine if performance of quantum processor 504 improved using the generated annealing parameters 510.

The methods discussed above could be implemented using either supervised learning methods or semi-supervised learning methods. In some implementations semi-supervised machine learning techniques may be employed to develop the parameters on the machine learning model without generating a full training set of improved annealing parameters. In some implementations, Variational Auto Encoder (VAE) machine learning techniques or reinforcement learning techniques could be used.

System for Selection of Annealing Parameters

Figure 6:
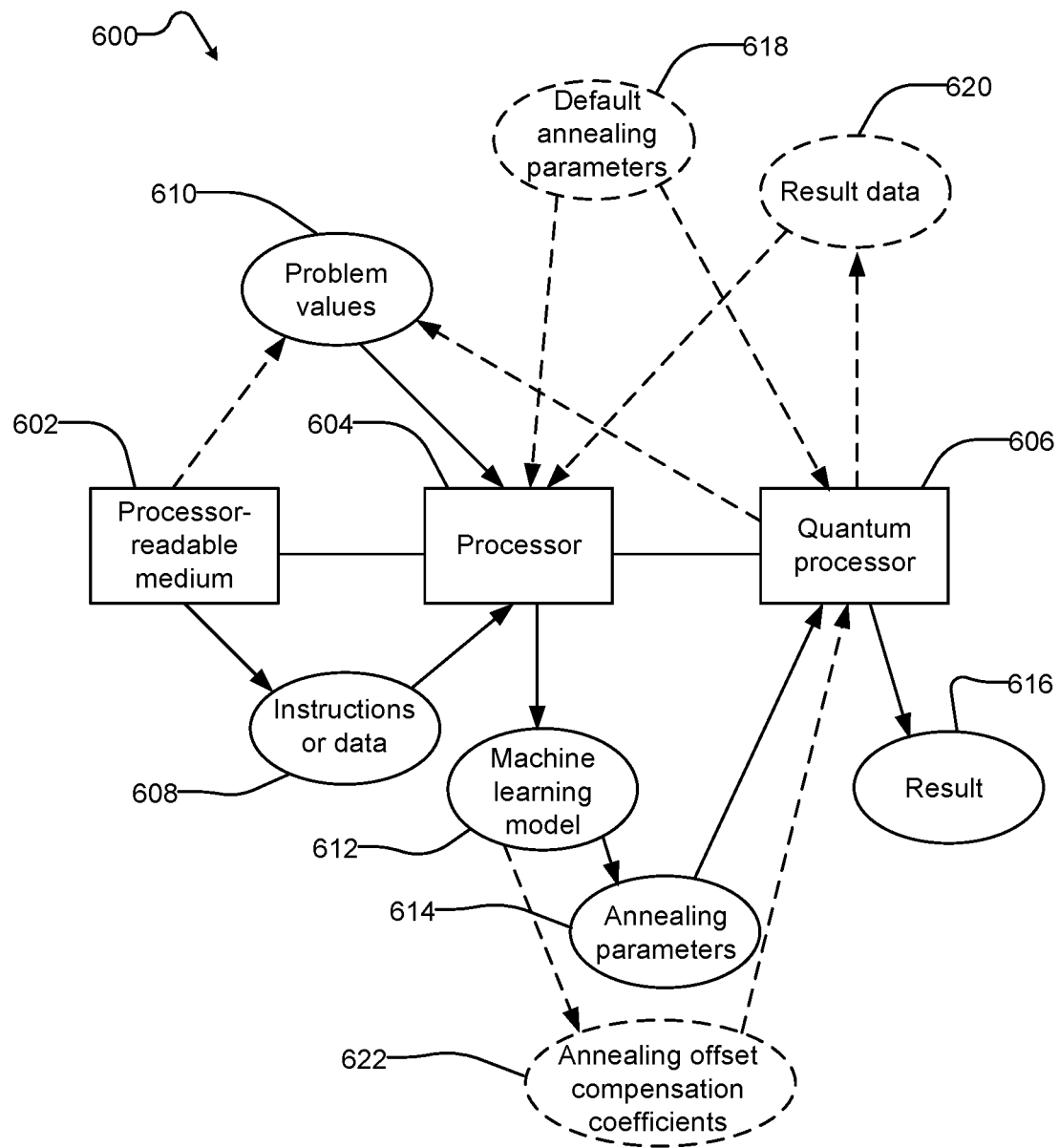
FIG. 6 is a schematic diagram illustrating a representative computing system, with flow between the portions of the computing system during the methods described herein illustrated.

FIG. 6 shows a system 600 for use in quantum processing having at least one non-transitory processor-readable medium 602 that stores at least one of processor executable instructions or data, and at least one processor 604 communicatively coupled to the at least one non-transitory processor-readable medium 602 and a quantum processor 606.

System 600 may be used to adjust a quantum annealing schedule for a computational problem in accordance with method 200 discussed above. In response to execution of the at least one of processor executable instructions or data 608 stored on processor readable medium 602, processor 604 receives a representation of a computation problem made up of a plurality of problem values 610. The representation of a computational problem may be a representation of a problem Hamiltonian. The problem values may, for example, be qubit and coupler parameters corresponding to the computational problem.

In addition, in response to execution of the at least one of processor executable instructions or data 608, processor 604 may receive a default annealing schedule made up of default annealing parameters 618. Default annealing parameters may, for example, be one or more of: default annealing offsets, default annealing speed, and default timing and duration of annealing pauses. Processor 604 may transmit instructions to quantum processor 606 to modify the default annealing schedule based on the at least one annealing parameter 614 to generate the at least a portion of an annealing schedule. Further, processor 604 may receive result data 620 generated by quantum processor 606 evolving from an initial state to a final state based on the computational problem and the default annealing schedule, and processor 604 may transform the plurality of problem values 610 and the result data 620 to generate the at least one annealing parameter 614.

Processor 604 transforms the plurality of problem values 610 based on a plurality of trained parameters of a machine learning model 612 to generate at least a portion of an annealing schedule made up of at least one annealing parameter 614. Machine learning model 612 may take a variety of forms as discussed above, such as a trained neural network. The at least one annealing parameter 614 may, for example, be one or more of: annealing offsets, annealing speed, and timing and duration of annealing pauses. The at least one annealing parameter 614 may also an annealing parameter that determines the annealing schedule for at least one qubit or may be a series of annealing parameters that determine the annealing schedule for all the qubits.

The machine learning model 612 may be trained to generate multiple annealing parameters to form a complete annealing schedule, or machine learning model 612 may produce only a portion of the required annealing parameters, with the other parameters being supplied, for example, by a user or by a default annealing schedule. As discussed in greater detail above, in addition to annealing parameters 614, machine learning model 612 may also generate at least one annealing offset compensation coefficient 622.

Processor 604 transmits instructions to quantum processor 606, thereby causing quantum processor 606 to evolve from an initial state to a final state based on the computational problem and the at least a portion of an annealing schedule, the final state producing a result 616 for the computational problem. The result 616 for the computational problem may be a result Hamiltonian. In the case where machine learning model 612 generates annealing offset compensation coefficients 622, processor 604 may transmit instructions to quantum processor 606 to update the computational problem with the annealing offset compensation coefficients 622 to generate an updated computational problem. Quantum processor 606 may evolve from an initial state to a final state based on the updated computational problem and the at least a portion of an annealing schedule to produce result 616 for the computational problem.

The above described method(s), process(es), or technique(s) could be implemented by a series of processor readable instructions stored on one or more nontransitory processor-readable media. Some examples of the above described method(s), process(es), or technique(s) method are performed in part by a specialized device such as an adiabatic quantum computer or a quantum annealer or a system to program or otherwise control operation of an adiabatic quantum computer or a quantum annealer, for instance a computer that includes at least one digital processor. The above described method(s), process(es), or technique(s) may include various acts, though those of skill in the art will appreciate that in alternative examples certain acts may be omitted and/or additional acts may be added. Those of skill in the art will appreciate that the illustrated order of the acts is shown for exemplary purposes only and may change in alternative examples. Some of the exemplary acts or operations of the above described method(s), process(es), or technique(s) are performed iteratively. Some acts of the above described method(s), process(es), or technique(s) can be performed during each iteration, after a plurality of iterations, or at the end of all the iterations.

The above description of illustrated implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art. The teachings provided herein of the various implementations can be applied to other methods of quantum computation, not necessarily the exemplary methods for quantum computation generally described above.

The various implementations described above can be combined to provide further implementations. All of the commonly assigned US patent application publications, US patent applications, foreign patents, and foreign patent applications referred to in this specification and/or listed in the Application Data Sheet are incorporated herein by reference, in their entirety, including but not limited to: United States Patent Application Publication No. US 2015/0363708; and United States Patent Application Publication No. US 2018/0330264, and U.S. Patent Application 62/970,217 filed Feb. 5, 2020.

These and other changes can be made to the implementations in light of the above-detailed description. In general, in the following claims, the terms used should not be construed to limit the claims to the specific implementations disclosed in the specification and the claims but should be construed to include all possible implementations along with the full scope of equivalents to which such claims are entitled. Accordingly, the claims are not limited by the disclosure.

The invention claimed is:

1. A method of adjusting a quantum annealing schedule for a computational problem, the method being performed by one or more processors, the method comprising:
   receiving a representation of the computational problem, the representation comprising a plurality of problem values;
   transforming the plurality of problem values based on a plurality of trained parameters of a machine learning model to generate at least a portion of an annealing schedule comprising at least one annealing offset parameter and at least one annealing offset compensation coefficient; and
   transmitting instructions comprising the at least one annealing offset compensation coefficient to a quantum processor to cause the quantum processor to update the computational problem with the at least one annealing offset compensation coefficient to generate an updated computational problem and evolve from an initial state to a final state based on the updated computational problem and the at least a portion of an annealing schedule, wherein the final state provides a result for the computational problem.

2. The method of claim 1, wherein transforming the plurality of problem values based on a plurality of trained parameters of a machine learning model to generate at least a portion of an annealing schedule comprises generating one or more of: annealing speed, and timing and duration of annealing pauses.

3. The method of claim 1, wherein transforming the plurality of problem values based on a plurality of trained parameters of a machine learning model to generate at least a portion of an annealing schedule comprising at least one annealing offset parameter comprises generating multiple annealing parameters to form an annealing schedule.

4. The method of claim 1, wherein receiving a representation of the computational problem, the representation comprising a plurality of problem values, comprises receiving problem values comprising qubit and coupler parameters corresponding to the computational problem.

5. The method of claim 4, wherein transforming the plurality of problem values based on a plurality of trained parameters of a machine learning model to generate at least a portion of an annealing schedule comprising at least one annealing offset parameter comprises generating an annealing parameter that determines the annealing schedule for at least one qubit.

6. The method of claim 1, wherein receiving a representation of the computational problem comprises receiving a representation of a computational problem comprising a problem Hamiltonian and wherein transmitting instructions to the quantum processor to cause the quantum processor to evolve from an initial state to a final state based on the computational problem and the at least a portion of an annealing schedule further comprises transmitting instructions to the quantum processor to cause the quantum processor to evolve from a problem Hamiltonian state to a result Hamiltonian state.

7. The method of claim 1, further comprising receiving a default annealing schedule, and wherein transforming the plurality of problem values based on a plurality of trained parameters of a machine learning model to generate at least a portion of an annealing schedule comprising at least one annealing offset parameter comprises modifying the default annealing schedule based on the at least one annealing offset parameter to generate the at least a portion of an annealing schedule.

8. The method of claim 7, wherein receiving a default annealing schedule comprises receiving one or more default annealing parameters comprising one or more of: default annealing offsets, default annealing speed, and default timing and duration of annealing pauses.

9. The method of claim 7, further comprising receiving result data generated by causing the quantum processor to evolve from an initial state to a final state based on the computational problem and the default annealing schedule, and wherein transforming the plurality of problem values based on a plurality of trained parameters of a machine learning model to generate at least a portion of an annealing schedule comprising at least one annealing offset parameter comprises transforming the plurality of problem values and the result data to generate at least a portion of an annealing schedule comprising at least one annealing parameter.

10. A system for use in quantum processing, comprising:
at least one non-transitory processor-readable medium that stores at least one of processor executable instructions and data; and
at least one processor communicatively coupled to the at least one non-transitory processor-readable medium and a quantum processor, and which, in response to execution of the at least one of processor executable instructions and data:
receives a representation of a computational problem, the representation comprising a plurality of problem values;
transforms the plurality of problem values based on a plurality of trained parameters of a machine learning model to generate at least a portion of an annealing schedule comprising at least one annealing offset parameter and at least one annealing offset compensation coefficient; and
transmits instructions to the quantum processor that cause the quantum processor to update the computational problem with the annealing offset compensation coefficients to generate an updated computational problem and evolve from an initial state to a final state based on the updated computational problem and the at least a portion of an annealing schedule, wherein the final state provides a result for the computational problem.

11. The system of claim 10, wherein the at least a portion of an annealing schedule comprises one or more of: annealing speed, and timing and duration of annealing pauses.

12. The system of claim 10, wherein the machine learning model is trained to generate multiple annealing parameters to form an annealing schedule.

13. The system of claim 10, wherein the plurality of problem values comprises qubit and coupler parameters corresponding to the computational problem.

14. The system of claim 13, wherein the at least one annealing offset parameter comprises an annealing parameter that determines the annealing schedule for at least one qubit.

15. The system of claim 10, wherein the representation of a computational problem comprises a representation of a problem Hamiltonian and the result for the computational problem comprises a result Hamiltonian.

16. The system of claim 10, wherein, in response to execution of the at least one of processor executable instructions and data, the at least one processor receives a default annealing schedule, and transmits instructions to the quantum processor to modify the default annealing schedule based on the at least one annealing offset parameter to generate the at least a portion of an annealing schedule.

17. The system of claim 16, wherein the default annealing schedule comprises one or more default annealing parameters comprising one or more of: default annealing speed, and default timing and duration of annealing pauses.

18. The system of claim 16, wherein, in response to execution of the at least one of processor executable instructions and data, the at least one processor receives result data generated by the quantum processor evolving from an initial state to a final state based on the computational problem and the default annealing schedule, and wherein the processor transforms the plurality of problem values and the result data to generate the at least a portion of an annealing schedule comprising the at least one annealing offset parameter.

* * * * *